US006802387B1

United States Patent
Kreger et al.

(10) Patent No.: US 6,802,387 B1
(45) Date of Patent: Oct. 12, 2004

(54) MUFFLER WITH EXTERNAL WATER TRAP

(75) Inventors: Ami E. Kreger, Johnson Creek, WI (US); Jay V. Warner, Stoughton, WI (US); Howard E. Tews, Beloit, WI (US); Timothy J. Palzkill, Stoughton, WI (US)

(73) Assignee: Fleet Guard, Inc., Nashville, TN (US)

( * ) Notice: Subject to any disclaimer, the term of this patent is extended or adjusted under 35 U.S.C. 154(b) by 0 days.

(21) Appl. No.: 10/259,095

(22) Filed: Sep. 27, 2002

(51) Int. Cl.[7] ................................................. F01N 7/08
(52) U.S. Cl. ....................... 181/228; 181/232; 181/212; 181/241; 181/253
(58) Field of Search ................................. 181/228, 232, 181/212, 241, 253

(56) References Cited

U.S. PATENT DOCUMENTS

| | | |
|---|---|---|
| 2,482,577 A | 9/1949 | Dahlstrom |
| 2,721,619 A | 10/1955 | Cheairs |
| 2,732,913 A | 1/1956 | Higgins |
| 3,817,221 A | 6/1974 | Nohira et al. |
| 4,310,067 A * | 1/1982 | Thomson .................... 181/228 |
| 4,450,934 A | 5/1984 | Davis |
| 4,527,659 A | 7/1985 | Harrington |
| 5,170,020 A | 12/1992 | Kruger et al. |
| 5,321,215 A * | 6/1994 | Kicinski ..................... 181/211 |
| 5,746,630 A | 5/1998 | Ford et al. |
| 5,808,245 A | 9/1998 | Wiese et al. |
| 6,152,258 A | 11/2000 | Deavers et al. |

FOREIGN PATENT DOCUMENTS

JP          11-72018          3/1999

* cited by examiner

Primary Examiner—Shih-Yung Hsieh

(57) ABSTRACT

A vertical mount muffler (40) has an external water trap (52) in an exhaust pipe (48) and drains water from a point between the muffler housing upper outlet (46) and the terminal end (50) of the exhaust pipe. The water trap (52) is laterally adjacent to the muffler housing (42) and below the housing upper outlet (46) and traps and drains water entering the exhaust pipe (48) from the terminal end (50).

14 Claims, 4 Drawing Sheets

MUFFLER WITH EXTERNAL WATER TRAP

BACKGROUND AND SUMMARY

The invention relates to mufflers, and more particularly to the combination with a water trap for protecting the muffler, particularly a catalytic substrate and matte mounting, during rain or when the vehicle is washed.

The invention arose during development efforts directed toward a diesel exhaust muffler in a transit bus, particularly a soot trap muffler having a catalytic substrate and matte mounting. It is desired to capture water that may enter a vertical exhaust outlet when washing the vehicle or during rain. A water trap serves to protect the catalytic substrate and matte mounting material. Water entry can lead to failure of the matte mounting material and/or plugging of the substrate due to matte erosion.

The existing muffler in the noted transit bus application is an oval vertically mounted muffler having a lower exhaust inlet and a laterally offset upper exhaust outlet. In replacing this muffler with a soot trap muffler, it is desired to provide a round cylindrical vertical exhaust stack, and to prevent entry of water as above noted. The existing muffler was about 30 inches long, or less in some instances. The muffler length and orientation were predetermined by the space constraints of the bus compartment. In the case of a soot trap muffler, the catalyst and/or soot filter adds significant length to the muffler. This additional length in combination with an internal water trap would exceed the length available to fit the muffler into the bus compartment.

Also in the existing oval muffler, the lateral offset between the inlet and outlet was about 9.5 inches. It is desired to maintain this lateral spacing, to facilitate proper exhaust stack alignment and to minimize modifications to existing tubing. It is also desirable that the inlet be laterally centered in the body of the muffler to provide optimum flow distribution across the catalyst face, rather than being laterally offset to one side of the catalyst face.

The present invention addresses and solves the above-noted desired design criteria. The invention has application beyond the noted bus installation.

DETAILED DESCRIPTION

Prior Art

Figure 1:
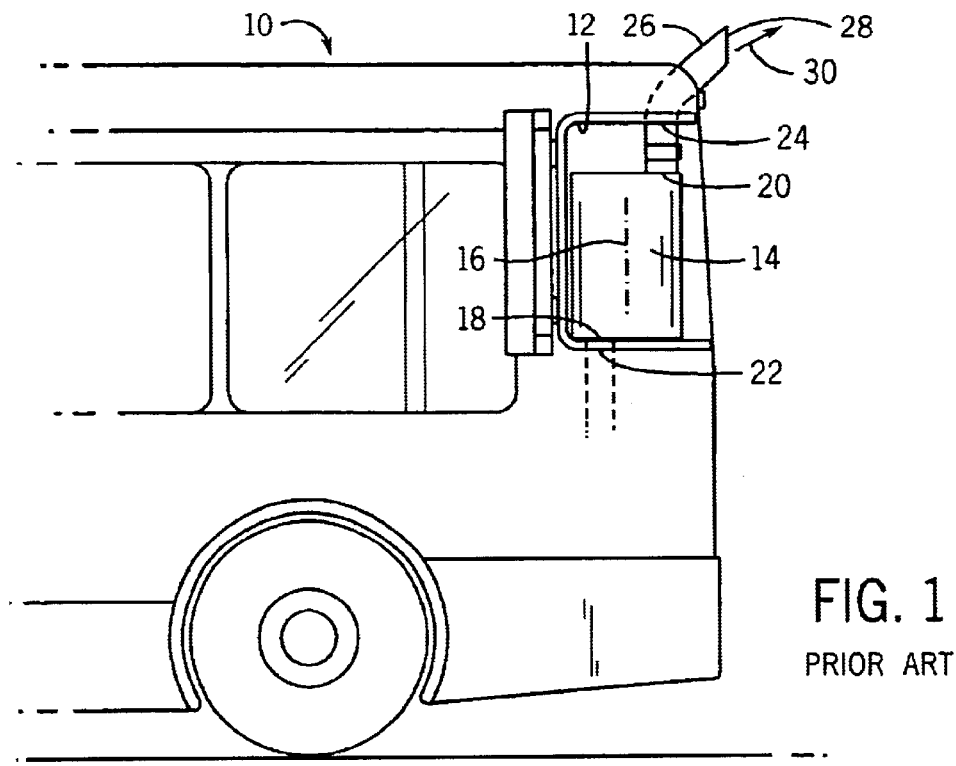
FIG. 1 is a side elevation view of a vertical mount muffler in a transit bus as known in the prior art.
Figure 2:
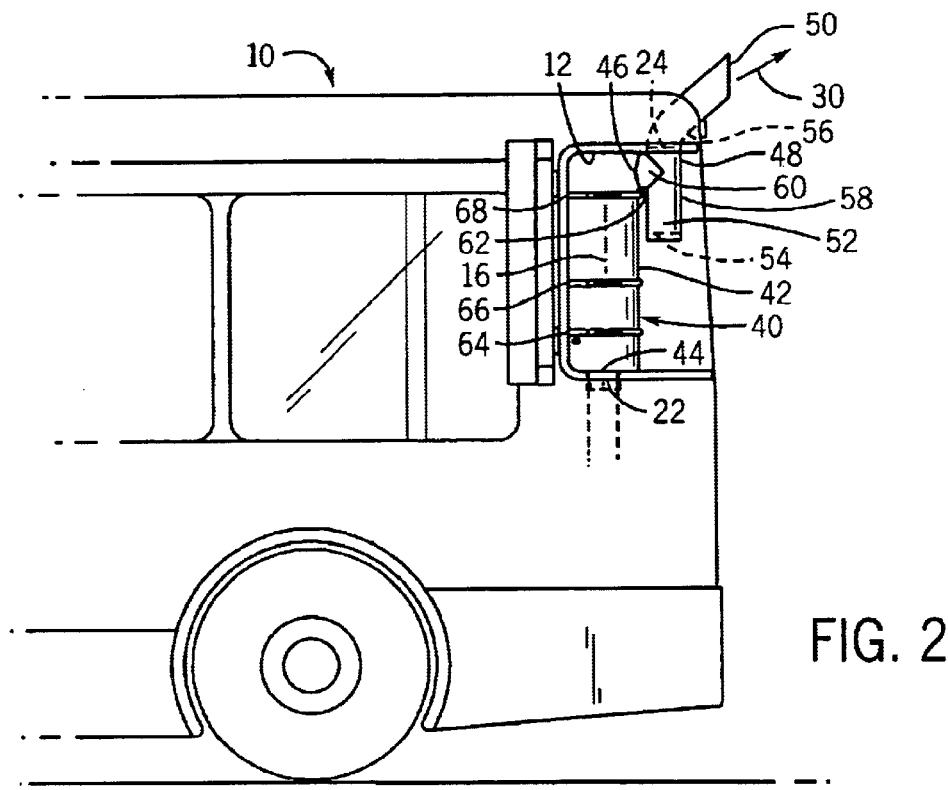
FIG. 2 is like FIG. 1 and shows the present invention.

FIG. 1 is a left side elevation view of the left rear end of a transit bus 10 having a muffler compartment 12 with a vertical mount muffler 14 therein. Muffler 14 is an oval shaped member extending axially along a vertical axis 16 and having a lower inlet 18 receiving exhaust from the internal combustion diesel engine of the bus, and having an upper outlet 20 discharging the exhaust. Compartment 12 has laterally offset exhaust inflow and outflow fittings 22 and 24 axially aligned respectively with muffler inlet 18 and outlet 20. An exhaust pipe 26 extends from upper outlet 20 and through outflow fitting 24 and directs the exhaust to the atmosphere at a terminal end 28 as shown at arrow 30.

Present Invention

FIGS. 2–5 illustrate the present invention and use like reference numerals from FIG. 1 where appropriate to facilitate understanding.

FIGS. 2–5 show a vertical mount muffler 40 in bus compartment 12 having a round cylindrical housing 42 extending axially along vertical axis 16 and having a lower inlet 44 receiving exhaust, and having an upper outlet 46 discharging the exhaust. An exhaust pipe 48 extends from housing upper outlet 46 and directs the exhaust to atmosphere as shown at arrow 30 at terminal end 50 of the exhaust pipe. A water trap 52 is provided in the exhaust pipe and drains water from a point between the muffler housing outlet and the terminal end of the exhaust pipe, such that the water trap traps and drains water entering the exhaust pipe from terminal end 50. The trap is preferably provided by a disc or flange having one or more apertures or drain holes 54.

Figure 3:
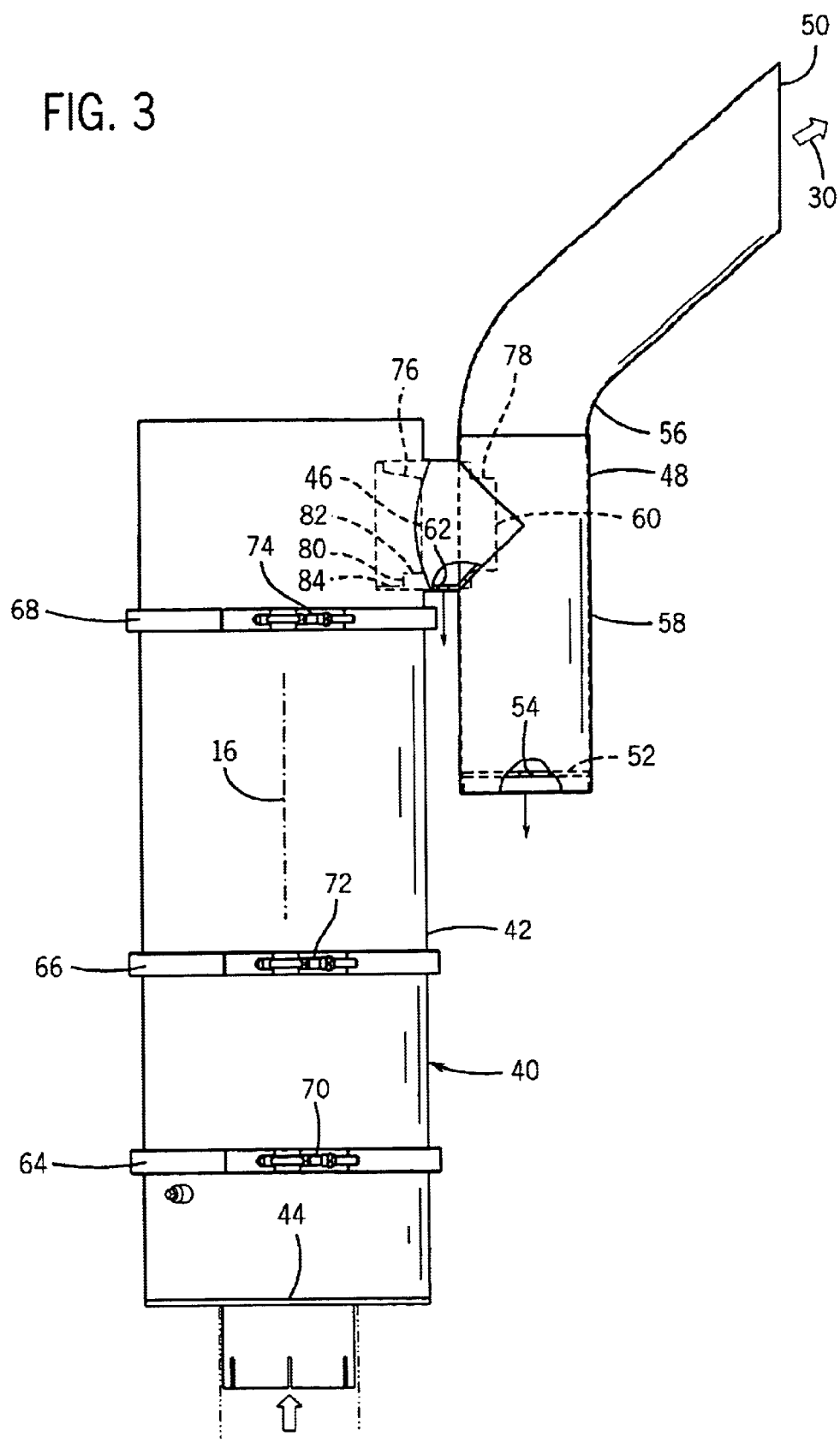
FIG. 3 is an enlarged view of a portion of FIG. 2.
Figure 4:
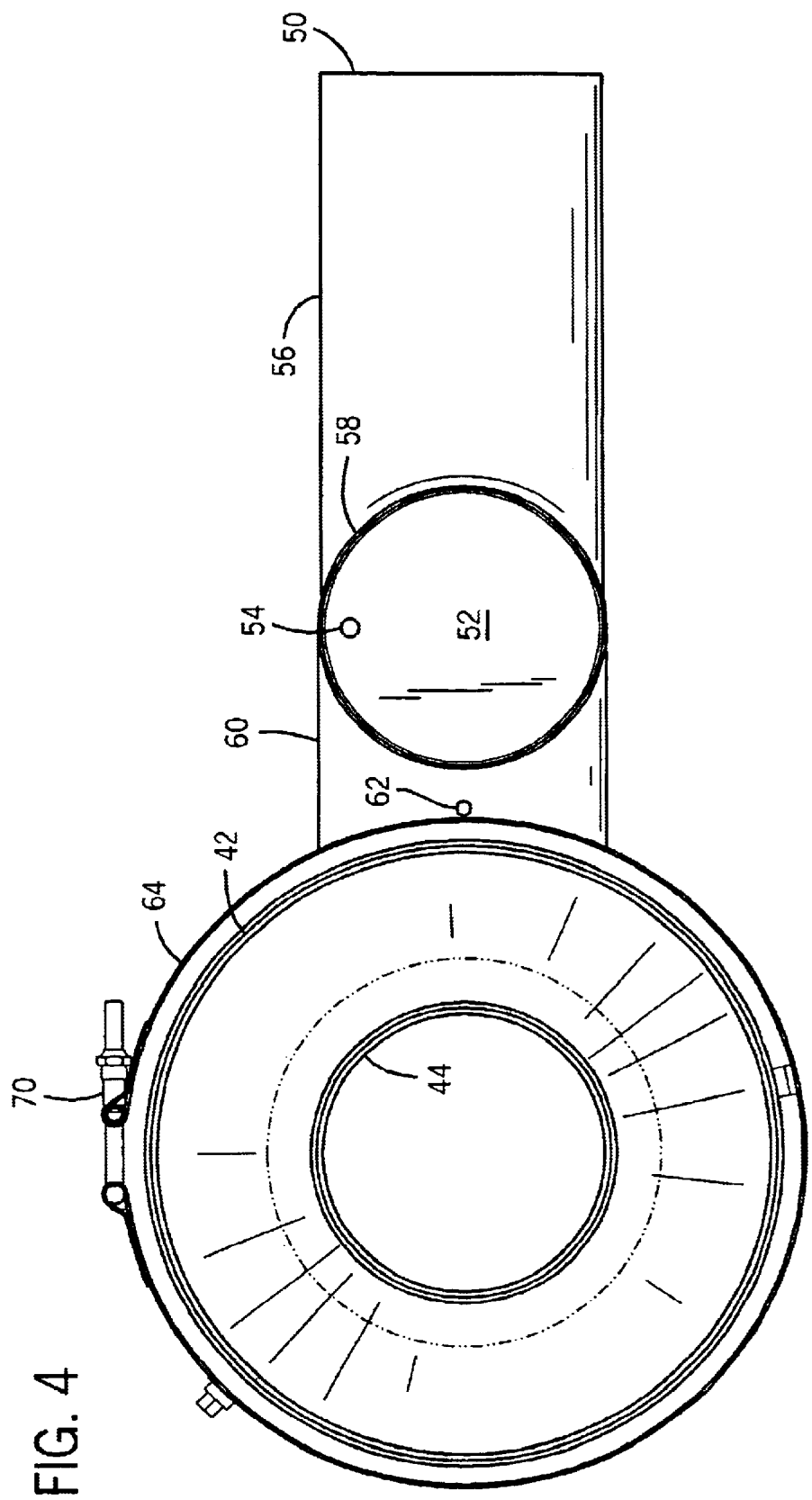
FIG. 4 is a bottom view of the structure of FIG. 3.

Exhaust pipe 48, FIG. 3, has first and second branches 56 and 58 meeting at a junction 60 receiving exhaust from housing upper outlet 46. First branch 56 has the noted terminal end 50. Second branch 58 has the noted water trap 52, which water trap is external to housing 42. Junction 60 extends to housing upper outlet 46. First branch 56 extends vertically upwardly from junction 46 and then is bent to extend upwardly and rearwardly to terminal end 50. Second branch 58 extends vertically downwardly from junction 60. Junction 60 and first and second branches 56 and 58 define a T-shape. Junction 60 receives exhaust from housing upper outlet 46. Water trap 52 in second branch 58 is gravitationally below junction 60. Terminal end 50 in first branch 56 is above junction 60.

In a further embodiment, a second water trap 62 is provided in junction 60 trapping and draining water entering exhaust pipe 48 from terminal end 50. In preferred form, second water trap 62 is provided by one or more apertures or drain holes in junction 60. First water trap 52 is gravitationally below second water trap 62.

Lower inlet 44 of housing 42 receives exhaust from inflow fitting 22 in compartment 12. Exhaust pipe 48 extends through outflow fitting 24 and directs exhaust to atmosphere as shown at 30 at terminal end 50. Water trap 52 is gravitationally below terminal end 50 of exhaust pipe 48, and is gravitationally below outflow fitting 24, and is gravitationally below housing upper outlet 46. Housing lower inlet 44 is axially aligned with inflow fitting 22. Housing upper outlet 46 discharges exhaust laterally from housing 42. Water trap 52 is external of and laterally adjacent to housing 42 and below housing upper outlet 46. A round shaped cylindrical muffler 40 is desired to enable addition or deletion of stages as desired, for example a catalyst section, a soot filter or particulate trap section, etc., which sections may be joined by annular bands such as 64, 66, 68, each having a respective clamp 70, 72, 74.

Figure 5:
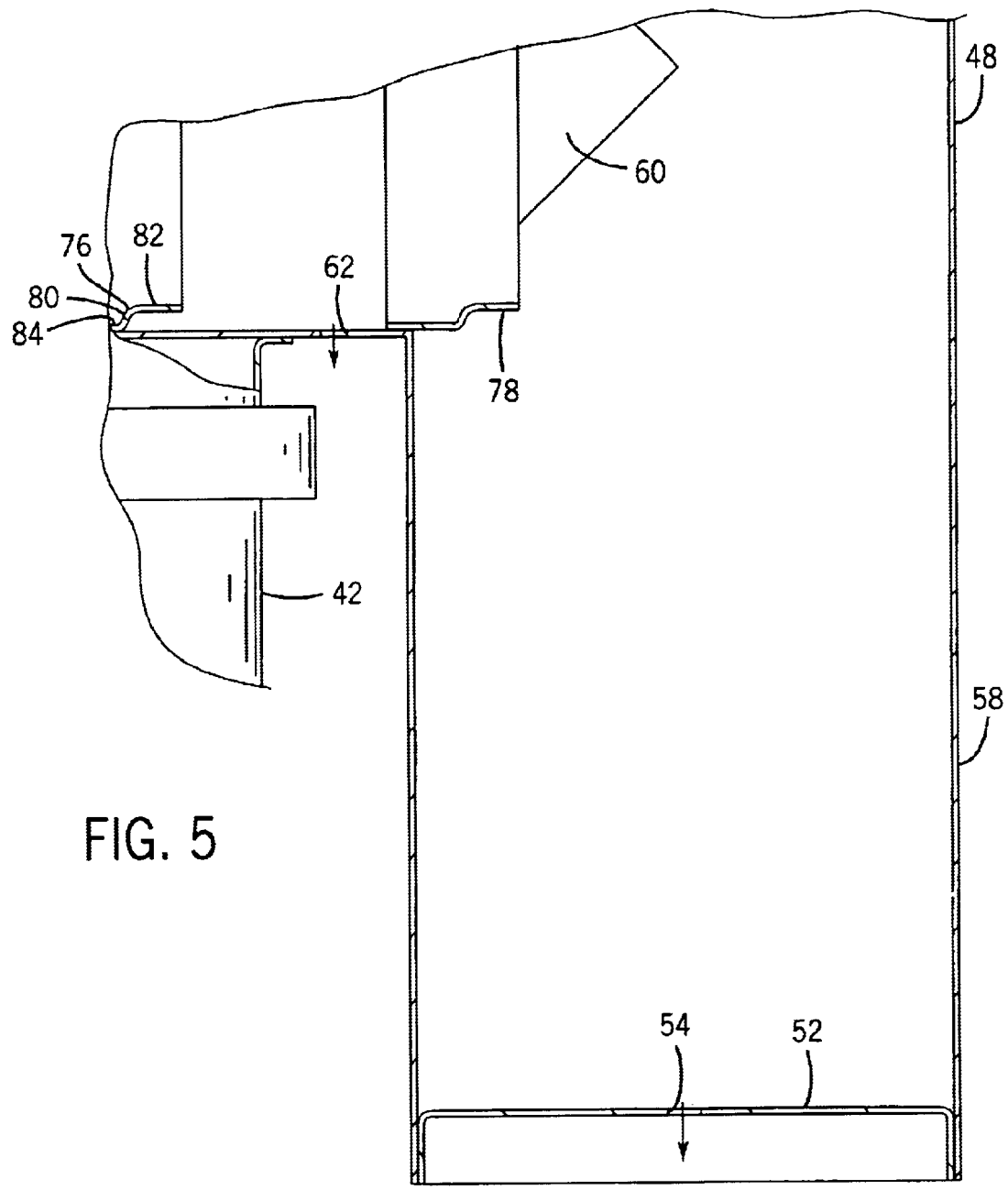
FIG. 5 is an enlarged view, partially cut away, of a portion of FIG. 3.

In a further embodiment, another water trap is provided in upper outlet 46 and junction 60 by one or more annular flanges as shown in dashed line at 76 and 78, FIG. 3, and in solid line in FIG. 5. For example, step or shoulder 80 between different diametered cylindrical portions 82 and 84 blocks inflow of water into the muffler.

It is recognized that various equivalents, alternatives and modifications are possible within the scope of the appended claims.

What is claimed is:

1. A muffler comprising a housing having an inlet receiving exhaust, and having an outlet discharging said exhaust, an exhaust pipe extending from said housing outlet and directing said exhaust to atmosphere at a terminal end of said exhaust pipe, a water trap in said exhaust pipe and draining water from a point between said housing outlet and said terminal end of said exhaust pipe such that said water trap traps and drains water entering said exhaust pipe from said terminal end, wherein said water trap is external to said housing.

2. The muffler according to claim 1 wherein said exhaust pipe comprises first and second branches meeting at a junction receiving said exhaust from said housing outlet, said first branch having said terminal end, said second branch having said water trap.

3. The muffler according to claim 2 wherein said junction extends horizontally to said housing outlet.

4. The muffler according to claim 3 wherein said first branch extends vertically upwardly from said junction, and said second branch extends vertically downwardly from said junction, said junction and said first and second branches defining a T-shape.

5. The muffler according to claim 2 wherein said junction receives exhaust from said housing outlet, and said water trap in said second branch is gravitationally below said junction.

6. The muffler according to claim 5 wherein said terminal end in said first branch is above said junction.

7. The muffler according to claim 2 comprising a second water trap in said junction trapping and draining water entering said exhaust pipe from said terminal end.

8. The muffler according to claim 7 wherein said first water trap is gravitationally below said second water trap.

9. The muffler according 7 comprising a third water trap in said junction adjacent said second water trap and trapping water entering said exhaust pipe from said terminal end.

10. The muffler according to claim 9 wherein said third water trap comprises an annular flange having first and second different diametered sections with a step shoulder therebetween, said step shoulder blocking inflow of water into said muffler and diverting such water for drainage at said second water trap.

11. The muffler according to claim 2 comprising a second water trap in said junction trapping water entering said exhaust pipe from said terminal end.

12. The muffler according to claim 11 wherein said second water trap comprises an annular flange having first and second different diametered portions with a step shoulder therebetween, which step shoulder blocks inflow of water into said muffler.

13. A vertical mount muffler in a compartment having laterally offset exhaust inflow and outflow fittings, comprising a housing extending axially along a vertical axis and having a lower inlet receiving exhaust from said inflow fitting, and having an upper outlet discharging said exhaust, an exhaust pipe extending from said housing upper outlet and through said outflow fitting and directing said exhaust to atmosphere at a terminal end, a water trap in said exhaust pipe and draining water from a point between said housing upper outlet and said terminal end of said exhaust pipe, such that said water trap traps and drains water entering said exhaust pipe from said terminal end, wherein said water trap is between said housing upper outlet and said outflow fitting, and wherein said water trap is gravitationally below said outflow fitting.

14. A vertical mount muffler in a compartment having laterally offset exhaust inflow and outflow fittings, comprising a housing extending axially along a vertical axis and having a lower inlet receiving exhaust from said inflow fitting, and having an upper outlet discharging said exhaust, an exhaust pipe extending from said housing upper outlet and through said outflow fitting and directing said exhaust to atmosphere at a terminal end, a water trap in said exhaust pipe and draining water from a point between said housing upper outlet and said terminal end of said exhaust pipe, such that said water trap traps and drains water entering said exhaust pipe from said terminal end, wherein said housing upper outlet discharges said exhaust laterally from said housing, and wherein said water trap is external of and laterally adjacent to said housing and below said housing upper outlet.

\* \* \* \* \*